(12) United States Patent
Voice

(10) Patent No.: US 8,490,281 B2
(45) Date of Patent: Jul. 23, 2013

(54) METHOD OF MANUFACTURING A METAL COMPONENT FROM METAL POWDER

(75) Inventor: Wayne E. Voice, Nottingham (GB)

(73) Assignee: Rolls-Royce PLC, London (GB)

( * ) Notice: Subject to any disclaimer, the term of this patent is extended or adjusted under 35 U.S.C. 154(b) by 445 days.

(21) Appl. No.: 12/861,355

(22) Filed: Aug. 23, 2010

(65) Prior Publication Data

US 2011/0072661 A1   Mar. 31, 2011

(30) Foreign Application Priority Data

Sep. 29, 2009   (GB) .................................. 0916995.4

(51) Int. Cl.
*B21K 25/00*   (2006.01)
*B23P 15/04*   (2006.01)

(52) U.S. Cl.
USPC ........................... 29/889.7; 29/889; 29/889.2

(58) Field of Classification Search
USPC ............ 29/889, 889.2–889.23, 889.7–889.72
See application file for complete search history.

(56) References Cited

U.S. PATENT DOCUMENTS

| 4,501,611 A | 2/1985 | Begg |
| 5,051,200 A * | 9/1991 | Srail et al. .................. 252/62.54 |
| 5,069,713 A | 12/1991 | Harris et al. |
| 5,238,751 A | 8/1993 | Van Der Zel |

FOREIGN PATENT DOCUMENTS

| GB | 2 076 430 A | 12/1981 |
| JP | A-2-221305 | 9/1990 |
| JP | A-2005-243794 | 9/2005 |

OTHER PUBLICATIONS

Search Report issued in British Application No. 0916995.4 dated Nov. 5, 2009.

* cited by examiner

*Primary Examiner* — Richard Chang
(74) *Attorney, Agent, or Firm* — Oliff & Berridge, PLC

(57) ABSTRACT

A method of manufacturing a metal component from metal powder comprises preparing (12) a metal powder, providing (14) gallium on at least part of the surface of at least some of the metal powder particles, encapsulating (16) the metal powder in a container, evacuating (18) the container to remove air and/or gas from the container, sealing (20) the container, hot isostatically pressing (22) the container to consolidate the metal powder particles to produce the metal component and removing (24) the container from the metal component. The process is used to produce gas turbine engine metal components, for example turbine discs with improved fatigue properties.

15 Claims, 1 Drawing Sheet

METHOD OF MANUFACTURING A METAL COMPONENT FROM METAL POWDER

The present invention relates to a method of manufacturing a metal component from metal powder and in particular to a method of manufacturing a metal component for a gas turbine engine.

It is known to manufacture gas turbine engine turbine discs or compressor discs by extruding and forging a cast metal ingot or by extruding and forging a powder metal billet.

A powder metal billet is manufactured by placing powder metal into a mild steel can. The mild steel can is subsequently sealed and evacuated to remove air. The sealed mild steel can containing the metal powder is then hot isostatically pressed to produce the metal billet, the mild steel can is removed and the metal billet is heat treated. The powder metal billet is heavily worked to eliminate defects believed to arise from prior powder metal particle boundaries, which persist through the hot isostatic pressing and heat treatment. These defects, the prior powder metal particle boundaries, are detrimental to fatigue properties. These prior powder metal particle boundaries arise due to the formation of highly stable metal oxides over a relatively large surface area of the powder metal particles.

The mechanical properties particularly, fatigue and fracture toughness, of turbine discs, or compressor discs, are critical to the working life of the turbine disc, or compressor disc, and so no compromises are made to the metal to jeopardise the mechanical properties of the turbine disc or compressor disc. The cleanliness of metal powders has been improved considerably by the elimination of detrimental ceramic inclusions by limiting the size of the metal powders to less than 50 micrometers. The other factor preventing the use of powder metal components is the thin metal oxide on the prior powder metal particles, which is difficult to detect by non destructive examination.

Accordingly the present invention seeks to provide a novel method of manufacturing a metal component from metal powder which reduces, preferably overcomes, the above mentioned problem.

Accordingly the present invention provides a method of manufacturing a metal component from metal powder comprising the steps of: —

(a) preparing a metal powder,
(b) providing gallium on at least part of the surface of at least some of the metal powder particles,
(c) encapsulating the metal powder in a container,
(d) evacuating the container to remove air and/or gas from the container,
(e) sealing the container,
(f) heating and applying pressure to the container to consolidate the metal powder particles to produce the metal component and
(g) removing the container from the metal component.

Preferably step (f) comprises hot isostatic pressing.
Preferably step (c) comprises encapsulating the metal powder in a mild steel container.
Preferably step (c) comprises supplying the metal powder into the container.
Preferably step (g) comprises machining or dissolving the container off the metal component.

Step (b) may comprise passing the metal powder over a plate of gallium to provide gallium on at least part of the surface of at least some of the metal powder particles.

Step (b) may comprise evaporating gallium on at least part of the surface of at least some of the metal powder particles.

Steps (b), (c) and (d) may be combined in a single step.

Step (b) may provide gallium on at least part of the surface of all of the metal powder particles.

Step (b) may provide gallium on all of the surfaces of at least some of the metal powder particles.

Step (b) may provide gallium on all of the surfaces of all of the metal powder particles.

Preferably step (b) provides less than 100 ppm gallium onto the surface of the metal powder particles.

Preferably step (d) comprises heating the container during the evacuation of the container to drive off water, hydrocarbons and/or other impurities.

Preferably step (d) comprises heating the container to a temperature of 100° C. to 400° C. during the evacuation of the container.

Preferably step (f) comprises heating to a temperature of 850° C. to 1250° and applying a pressure of 50 MPa to 150 MPa.

Step (b) may comprise reacting the gallium with metal oxides on the metal powder particles to form gallium oxide and step (d) comprises removing gallium oxide from the container.

Preferably the metal powder comprises a nickel alloy powder, a cobalt alloy powder or a titanium alloy powder.

Preferably the metal component is a turbine disc or a compressor disc.

Preferably the metal component is a component of a gas turbine engine.

The present invention will be more fully described by way of example with reference to the accompanying drawings in which: —

Figure 1:
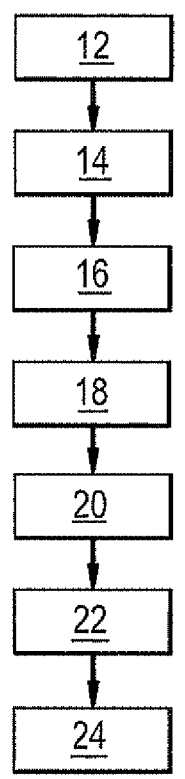
FIG. 1 shows a schematic diagram showing a method of manufacturing a metal component from metal powder according to the present invention.

A method of manufacturing a metal component from metal powder 10 is illustrated in FIG. 1 and the method comprises initially preparing a metal powder 12 of suitable composition for the metal component. The metal powder may comprise a nickel alloy powder, a cobalt alloy powder or a titanium alloy powder. Then there is a step of providing gallium 14 on at least part of the surface of at least some of the metal powder particles and the step of providing gallium 14 on at least part of the surface of at least some of the metal powder particles and in this example comprises passing the metal powder over a plate of gallium to provide gallium on at least part of the surface of at least some of the metal powder particles. Then there is a step of encapsulating the metal powder 16 in a container and comprises supplying the metal powder into the container, in this example the encapsulating of the metal powder 16 comprises encapsulating the metal powder 16 in a mild steel container. Next there is a step of evacuating the container 18 to remove air and/or gas from the container and a step of sealing the container 20. Then there is a step of heating and applying pressure to the container 22 to consolidate the metal powder particles to produce the metal component and the step of heating and applying pressure to the container 22 preferably comprises hot isostatic pressing. The hot isostatic pressing is performed at a temperature of 1050° C. to 1250° C. and at a pressure of 50 MPa to 150 MPa for a nickel alloy powder and at a temperature of 850° C. to 1000°

C. and at a pressure of 50 MPa to 150 MPa for a titanium alloy powder. Next there is a step of removing the container 24 from the metal component and the step of removing the container 24 comprises machining, e.g. grinding etc, or dissolving, e.g. using an acid, the container off the metal component.

The metal component produced may be a net-shape metal component requiring no further machining or processing. However, if the metal component produced is not a net-shape metal powder there is a further step, or further steps, of machining and/or other processing to give the metal component its final shape. The machining may comprise conventional turning, grinding and milling or may be chemical forming, electro-chemical machining or electro-discharge machining.

Figure 2:
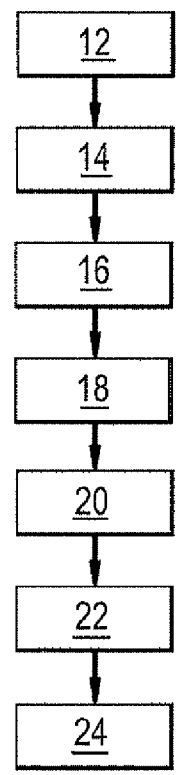
FIG. 2 shows a schematic diagram showing another method of manufacturing a metal component from metal powder according to the present invention.

Another method of manufacturing a metal component from metal powder 10B is illustrated in FIG. 2 and the method comprises initially preparing a metal powder 12 of suitable composition for the metal component. The metal powder may comprise a nickel alloy powder, a cobalt alloy powder or a titanium alloy powder. Then there is a step of providing gallium 14 on at least part of the surface of at least some of the metal powder particles and the step of providing gallium 14 on at least part of the surface of at least some of the metal powder particles and in this example comprises evaporating gallium, on at least part of the surface of at least some of the metal powder particles. The providing of the gallium on at least part of the surface of at least some of the metal powder particles may comprise sputter coating, direct heat evaporation in a vacuum or vapour deposition. Then there is a step of encapsulating the metal powder 16 in a container and comprises supplying the metal powder into the container, in this example the encapsulating of the metal powder 16 comprises encapsulating the metal powder 16 in a mild steel container. Next there is a step of evacuating the container 18 to remove air and/or gas from the container and a step of sealing the container 20. Then there is a step of heating and applying pressure to the container 22 to consolidate the metal powder particles to produce the metal component and the step of heating and applying pressure to the container 22 preferably comprises hot isostatic pressing. The hot isostatic pressing is performed at a temperature of 1050° C. to 1250° C. and at a pressure of 50 MPa to 150 MPa for a nickel alloy powder and at a temperature of 850° C. to 1000° C. and at a pressure of 50 MPa to 150 MPa for a titanium alloy powder. Next there is a step of removing the container 24 from the metal component and the step of removing the container 24 comprises machining, e.g. grinding etc, or dissolving, e.g. using an acid, the container off the metal component.

The metal component produced may be a net-shape metal component requiring no further machining or processing. However, if the metal component produced is not a net-shape metal powder there is a further step, or further steps, of machining and/or other processing to give the metal component its final shape. The machining may comprise conventional turning, grinding and milling or may be chemical forming, electro-chemical machining or electro-discharge machining.

In the methods described with reference to FIG. 1 and FIG. 2 the gallium may be heated to react with the metal oxides on the metal powder particles while the metal powder particles are in the container and the gallium oxide may be evacuated with other gases from the container before consolidation.

The step of providing gallium 14 on at least part of the surface of at least some of the metal powder particles provides only trace amounts of gallium, for example less than 100 ppm gallium onto the surface of the metal powder particles. It is believed that the gallium, which has a melting point of 32° C., evaporates on heating during the step where heat and pressure is applied for consolidation of the metal powder to coat all the surfaces of all the metal powder particles and the gallium breaks down the existing metal oxide layers on the surfaces of the metal powder particles that are a barrier to inter-surface diffusion and hence the diffusion bonding of the metal powder particles. It is believed that the gallium reacts with the metal oxides, the metal oxide layers on the surfaces of the metal power particles to form gallium oxide which is a volatile oxide. The gallium does not diffuse into the metal powder particles to form gallium phases at the surface of the metal powder particles. The subsequently formed metal component is free from prior powder metal particle boundaries and hence the metal component is a high integrity metal component with improved fatigue properties compared to metal components produced from metal powder without using gallium.

Figure 3:
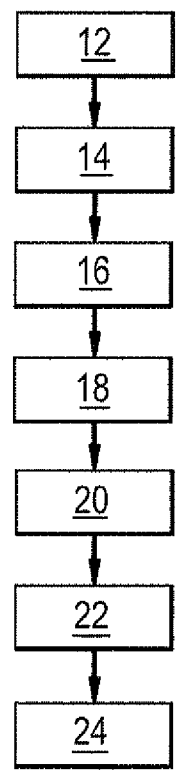
FIG. 3 shows a schematic diagram showing a further method of manufacturing a metal component from metal powder according to the present invention.

A further method of manufacturing a metal component from metal powder 10C is illustrated in FIG. 3 and the method comprises initially preparing a metal powder 12 of suitable composition for the metal component. The metal powder may comprise a nickel alloy powder, a cobalt alloy powder or a titanium alloy powder. Then there is a step of providing gallium 14 on at least part of the surface of at least some of the metal powder particles and the step of providing gallium 14 on at least part of the surface of at least some of the metal powder particles and in this example comprises evaporating gallium on at least part of the surface of at least some of the metal powder particles. The providing of the gallium on at least part of the surface of at least some of the metal powder particles may comprise sputter coating, direct heat evaporation in a vacuum or vapour deposition. There is a step of encapsulating the metal powder 16 in a container and comprises supplying the metal powder into the container, in this example the encapsulating of the metal powder 16 comprises encapsulating the metal powder 16 in a mild steel container. There is a step of evacuating the container 18 to remove air and/or gas from the container and a step of sealing the container 20. In this method the step of providing gallium 14 on the on at least part of the surface of at least some of the metal powder particles, the step of encapsulating the metal powder 16 in a container and the step of evacuating the container 18 are combined in a single step. For example as the metal powder is supplied into the container it is cascaded, during the filling of the container to aid the removal of air by the evacuation process and at the same time gallium is evaporated onto the metal powder as it is cascaded. During the cascading of the metal powder it is supplied, dropped, sequentially onto a series of angled plates before entering a funnel into the container. During the filling of the container the metal powder is heated, or the heat from the evaporated metal powder heats the metal powder, and it is theorised that the gallium evaporated onto the surfaces of all the metal powder particles reacts with the metal oxides in the metal oxide layers on the surfaces of the metal powder particles to form gallium oxide. The gallium oxide is a volatile oxide and is removed from the container while the container is evacuated. The gallium does not diffuse into the metal powder particles to form gallium phases at the surface of the metal powder particles. Then there is a step of heating and applying pressure to the container 22 to consolidate the metal powder particles to produce the metal component and the step of heating and applying pressure to the container 22 preferably comprises hot isostatic pressing. The hot isostatic pressing is performed at a temperature of 1050° C. to 1250° C. and at a pressure of 50 MPa to 150 MPa for a nickel alloy powder and at a temperature of 850° C. to 1000° C. and at a pressure of 50 MPa to 150 MPa for a titanium alloy powder. Next there is a step of removing the container 24 from the metal component and the step of removing the container 24 comprises machining, e.g. grinding etc, or dissolving, e.g. using an acid, the container off the metal component.

The metal component produced may be a net-shape metal component requiring no further machining or processing. However, if the metal component produced is not a net-shape metal powder there is a further step, or further steps, of machining and/or other processing to give the metal component its final shape. The machining may comprise conventional turning, grinding and milling or may be chemical forming, electro-chemical machining or electro-discharge machining.

The gallium may be provided on at least part of the surface of all of the metal powder particles. The gallium may be provided on all of the surfaces of at least some of the metal powder particles. Preferably the gallium is provided on all of the surfaces of all of the metal powder particles.

Figure 4:
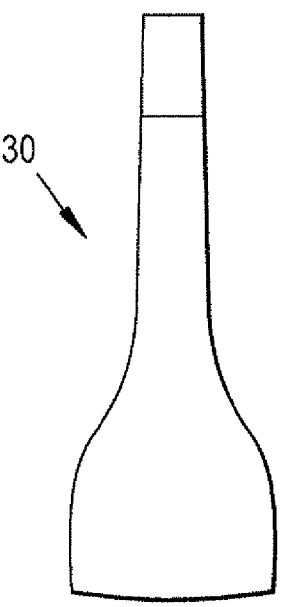
FIG. 4 shows a gas turbine engine turbine disc produced by a method according to the present invention.

FIG. 4 shows a gas turbine engine turbine disc 30 which has been produced from a metal powder using a method according to the present invention. The turbine disc 30 may be manufactured from a metal powder of RR1000 or Udimet 720Li®. RR1000 consists of 18.5 wt % cobalt, 15 wt % chromium, 5 wt % molybdenum, 3 wt % aluminium, 3.6 wt % titanium, 2 wt % tantalum, 0.5 wt % hafnium, 0.06 wt % zirconium, 0.027 wt % carbon, 0.015 wt % boron and the balance nickel plus incidental impurities. Udimet 720Li® consists of 15 wt % cobalt, 16 wt % chromium, 3 wt % molybdenum, 1.25 wt % W, 2.5 wt % aluminium, 5 wt % titanium, 0.015 wt % carbon, 0.015 wt % boron and the balance nickel plus incidental impurities. Other metal powders suitable for manufacturing the turbine disc are Astroloy®, Rene95®, Rene88DT®, ME3®, Alloy 10® and LSHR®.

Another metal powder which may be used is IN718®.

Although the present invention has been described with reference to a nickel alloy powder, a cobalt alloy powder or a titanium alloy powder, it is equally applicable to nickel powders, cobalt powders or titanium powders.

The metal component is preferably a turbine disc or a compressor disc, but the metal component may be another metal component of a gas turbine engine.

It may be beneficial to heat the container during the evacuation of the container to drive off water, hydrocarbons and/or other impurities. The container may be heated to a temperature of 100° C. to 400° C. during the evacuation of the container.

The invention claimed is:

1. A method of manufacturing a metal component from a metal powder, the metal powder comprising metal powder particles, comprising the steps of:
    (a) preparing a metal powder, wherein the metal powder is selected from the group consisting of a nickel alloy powder, a cobalt alloy powder, and a titanium alloy powder,
    (b) providing gallium on at least a part of a surface of at least some of the metal powder particles, providing less than 100 ppm gallium onto the surface of the metal powder particles,
    (c) encapsulating the metal powder in a container,
    (d) evacuating the container to remove gas from the container,
    (e) sealing the container,
    (f) heating and applying pressure to the container to consolidate the metal powder particles to produce the metal component, and
    (g) removing the container from the metal component, wherein:
    the metal powder particles have metal oxides;
    step (b) further comprises reacting the gallium with the metal oxides on the metal powder particles to form gallium oxide; and
    step (d) further comprises removing the gallium oxide from the container.

2. The method as claimed in claim wherein step (b) further comprises passing the metal powder over a plate of the gallium to provide the gallium on at least part of the surface of at least some of the metal powder particles.

3. The method as claimed in claim 1, wherein step (b) further comprises evaporating the gallium on at least part of the surface of at least some of the metal powder particles.

4. The method as claimed in claim 1, wherein steps (b), (c) and (d) are combined in a single step.

5. The method as claimed in claim 1, wherein step (f) further comprises hot isostatic pressing.

6. The method as claimed in claim 1, wherein step (c) further comprises encapsulating the metal powder in a mild steel container.

7. The method as claimed in claim 1, wherein step (c) further comprises supplying the metal powder into the container.

8. The method as claimed in claim 1, wherein step (g) further comprises machining or dissolving the container off the metal component.

9. The method as claimed in claim 1, wherein step (b) provides the gallium on at least part of the surface of all of the metal powder particles.

10. The method as claimed in claim 1, wherein step (b) provides the gallium on all of the surfaces of at least some of the metal powder particles.

11. The method as claimed in claim 1, wherein step (b) provides gallium on all of the surfaces of all of the metal powder particles.

12. The method as claimed in claim 1, wherein the metal component is a turbine disc or a compressor disc.

13. The method as claimed in claim 1 wherein, the metal component is a component of a gas turbine engine.

14. A method of manufacturing a metal component from a metal powder, the metal powder comprising metal powder particles, comprising the steps of:
    (a) preparing a metal powder, the metal powder is selected from the group comprising a nickel alloy powder, a cobalt alloy powder and a titanium alloy powder,
    (b) providing gallium on at least a part of a surface of a least some of the metal powder particles,
    (c) encapsulating the metal powder in a container,
    (d) evacuating the container to remove gas from the container,
    (e) sealing the container,
    (f) heating and applying pressure to the container to consolidate the metal powder particles to produce the metal component, and
    (g) removing the container from the metal component, wherein:
    the metal powder particles have metal oxides;
    step (b) further comprises reacting the gallium with the metal oxides on the metal powder particles to form gallium oxide; and
    step (d) further comprises removing the gallium oxide from the container.

15. A method of manufacturing a metal component from a metal powder, the metal powder comprising metal powder particles, comprising the steps of:

(a) preparing a metal powder, wherein the metal powder is selected from the group consisting of a nickel alloy powder, a cobalt alloy powder, and a titanium alloy powder,
(b) providing gallium on at least a part of a surface of at least some of the metal powder particles, providing less than 100 ppm gallium onto the surface of the metal powder particles,
(c) encapsulating the metal powder in a container,
(d) evacuating the container to remove gas from the container,
(e) sealing the container,
(f) heating and applying pressure to the container to consolidate the metal powder particles to produce the metal component, and
(g) removing the container from the metal component,
wherein steps (b), (c), and (d) are combined in a single step.

* * * * *